United States Patent
Edwards et al.

(10) Patent No.: US 10,142,792 B2
(45) Date of Patent: Nov. 27, 2018

(54) METHOD AND APPARATUS FOR MANAGEMENT OF LOCATION INFORMATION

(71) Applicants: AT&T INTELLECTUAL PROPERTY I, L.P., Atlanta, GA (US); AT&T Mobility II LLC, Atlanta, GA (US)

(72) Inventors: Greg W. Edwards, Austin, TX (US); Michael Lattanzi, Bothell, WA (US); Constance Missimer, Seattle, WA (US); James Pratt, Round Rock, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 15/497,766

(22) Filed: Apr. 26, 2017

(65) Prior Publication Data

US 2017/0230800 A1    Aug. 10, 2017

Related U.S. Application Data

(63) Continuation of application No. 14/964,826, filed on Dec. 10, 2015, now Pat. No. 9,668,103.

(51) Int. Cl.
*H04W 4/02* (2018.01)
*H04W 4/029* (2018.01)
(Continued)

(52) U.S. Cl.
CPC .......... *H04W 4/029* (2018.02); *G09B 29/003* (2013.01); *H04L 67/18* (2013.01); *G06F 17/30241* (2013.01); *G06Q 10/1093* (2013.01)

(58) Field of Classification Search
CPC ....... H04W 4/02; H04W 4/021; H04W 4/025; H04W 4/028
See application file for complete search history.

(56) References Cited

U.S. PATENT DOCUMENTS

| | | |
|---|---|---|
| 6,529,136 B2 | 3/2003 | Cao et al. |
| 6,968,179 B1 | 11/2005 | De Vries |

(Continued)

FOREIGN PATENT DOCUMENTS

| | | |
|---|---|---|
| WO | 2007143106 A2 | 12/2007 |
| WO | 2011095897 | 8/2011 |
| WO | 2015002667 | 1/2015 |

OTHER PUBLICATIONS

Backstrom, Lars et al., "Find me if you can: improving geographical prediction with social and spatial proximity", Proceedings of the 19th international conference on World wide web, ACM, 2010.

(Continued)

*Primary Examiner* — Christopher M Brandt
(74) *Attorney, Agent, or Firm* — Guntin & Gust, PLC; Robert Gingher

(57) ABSTRACT

Aspects of the subject disclosure may include, for example, presenting, in a map, an interaction region associated with a user, where the interaction region is determined according to a current location, an activity, a predicted future location, and a predicted future activity of the second user, and according to a relationship between the user and another users, where the interaction region represents a geographic area in which the user is determined to be available to meet with the other user. Other embodiments are disclosed.

20 Claims, 7 Drawing Sheets

300

(51) Int. Cl.
*H04L 29/08* (2006.01)
*G09B 29/00* (2006.01)
*G06Q 10/10* (2012.01)
*G06F 17/30* (2006.01)

(56) References Cited

U.S. PATENT DOCUMENTS

| | | | |
|---|---|---|---|
| 7,917,866 B1 | 3/2011 | Karam et al. | |
| 8,073,460 B1 | 12/2011 | Scofield et al. | |
| 8,290,999 B2 | 10/2012 | Shepherd et al. | |
| 8,554,477 B2 | 10/2013 | Coughlin et al. | |
| 8,718,934 B1 | 5/2014 | Erdmann et al. | |
| 8,780,162 B2 | 7/2014 | Murphy et al. | |
| 8,824,748 B2 | 9/2014 | Tseng | |
| 8,891,832 B2 | 11/2014 | Tseng | |
| 8,983,500 B2 | 3/2015 | Yach | |
| 9,068,851 B2 | 6/2015 | Lerenc | |
| 9,080,876 B2 | 7/2015 | Denicola | |
| 9,140,566 B1 | 9/2015 | Curtis et al. | |
| 9,175,964 B2 | 11/2015 | Forstall et al. | |
| 2003/0004743 A1 | 1/2003 | Callegari et al. | |
| 2006/0200435 A1 | 9/2006 | Flinn et al. | |
| 2006/0223518 A1 | 10/2006 | Haney et al. | |
| 2007/0282621 A1 | 12/2007 | Altman et al. | |
| 2007/0296574 A1 | 12/2007 | Smith et al. | |
| 2008/0070593 A1* | 3/2008 | Altman | H04L 63/102 455/457 |
| 2008/0153512 A1 | 6/2008 | Kale et al. | |
| 2009/0100037 A1 | 4/2009 | Scheibe et al. | |
| 2009/0281719 A1 | 11/2009 | Jakobson et al. | |
| 2012/0047087 A1 | 2/2012 | Amidon et al. | |
| 2013/0059606 A1* | 3/2013 | Pujol | H04W 4/023 455/456.3 |
| 2013/0080204 A1* | 3/2013 | Khorashadi | G06Q 10/109 705/7.19 |
| 2013/0238540 A1 | 9/2013 | O'Donoghue et al. | |
| 2013/0303195 A1 | 11/2013 | Bahl et al. | |
| 2014/0006518 A1 | 1/2014 | Sinkov et al. | |
| 2014/0058778 A1 | 2/2014 | McLarty et al. | |
| 2014/0143352 A1 | 5/2014 | Yegnashankaran et al. | |
| 2014/0229099 A1 | 8/2014 | Garrett et al. | |
| 2014/0278668 A1 | 9/2014 | Paradise et al. | |
| 2014/0280718 A1 | 9/2014 | Cepuran et al. | |
| 2014/0282040 A1* | 9/2014 | Alfaro | H04L 51/20 715/739 |
| 2015/0058057 A1* | 2/2015 | Egan | G06Q 10/1095 705/7.19 |
| 2015/0073698 A1 | 3/2015 | Samuel | |
| 2015/0126233 A1 | 5/2015 | Burns et al. | |
| 2015/0261844 A1 | 9/2015 | Ramalho | |
| 2017/0064015 A1* | 3/2017 | Davis | H04L 67/18 |
| 2017/0171715 A1 | 6/2017 | Edwards et al. | |

OTHER PUBLICATIONS

Bicocchi, Nicola et al., "Supporting location-aware services for mobile users with the whereabouts diary", Proceedings of the 1st international conference on MOBILe Wireless MiddleWARE, 2008.

Fithian, Rachel et al., "The design and evaluation of a mobile location-aware handheld event planner", Human-Computer Interaction with Mobile Devices and Services. Springer Berlin Heidelberg, 2003, 145-160.

Horvitz, Eric et al., "Coordinate: Probabilistic forecasting of presence and availability", Proceedings of the Eighteenth conference on Uncertainty in artificial intelligence. Morgan Kaufmann Publishers Inc, 2002.

Martin, M. et al., "Learning to detect user activity and availability from a variety of sensor data", IEEE, 2004.

Xia, Feng et al., "Socially aware networking: A survey", 2013.

Xie, Kexin et al., "From trajectories to activities: a spatio-temporal join approach", Proceedings of the 2009 International Workshop on Location Based Social Networks, 2009.

Yazji, Sausan et al., "Efficient location aware intrusion detection to protect mobile devices", Personal and Ubiquitous Computing 18.1, 2014, 143-162.

Zheng, Yu et al., "GeoLife: A Collaborative Social Networking Service among User, Location and Trajectory", Microsoft Research Asia, IEEE, 2010, 8 pages.

* cited by examiner

100

700

METHOD AND APPARATUS FOR MANAGEMENT OF LOCATION INFORMATION

CROSS-REFERENCE TO RELATED APPLICATIONS

This application is a continuation of U.S. application Ser. No. 14/964,826, filed Dec. 10, 2015, which is incorporated herein by reference in its entirety.

FIELD OF THE DISCLOSURE

The subject disclosure relates to a method and apparatus for management of location information.

BACKGROUND

Users can share various information with other users, including media content and where they have been. Tagging a location shows value from a historical perspective. Your social network can see where you have been. It does not help them to understand if you are still there, or if you are going to be there in a particular time.

BRIEF DESCRIPTION OF THE DRAWINGS

Reference will now be made to the accompanying drawings, which are not necessarily drawn to scale, and wherein.

DETAILED DESCRIPTION

Figure 1:
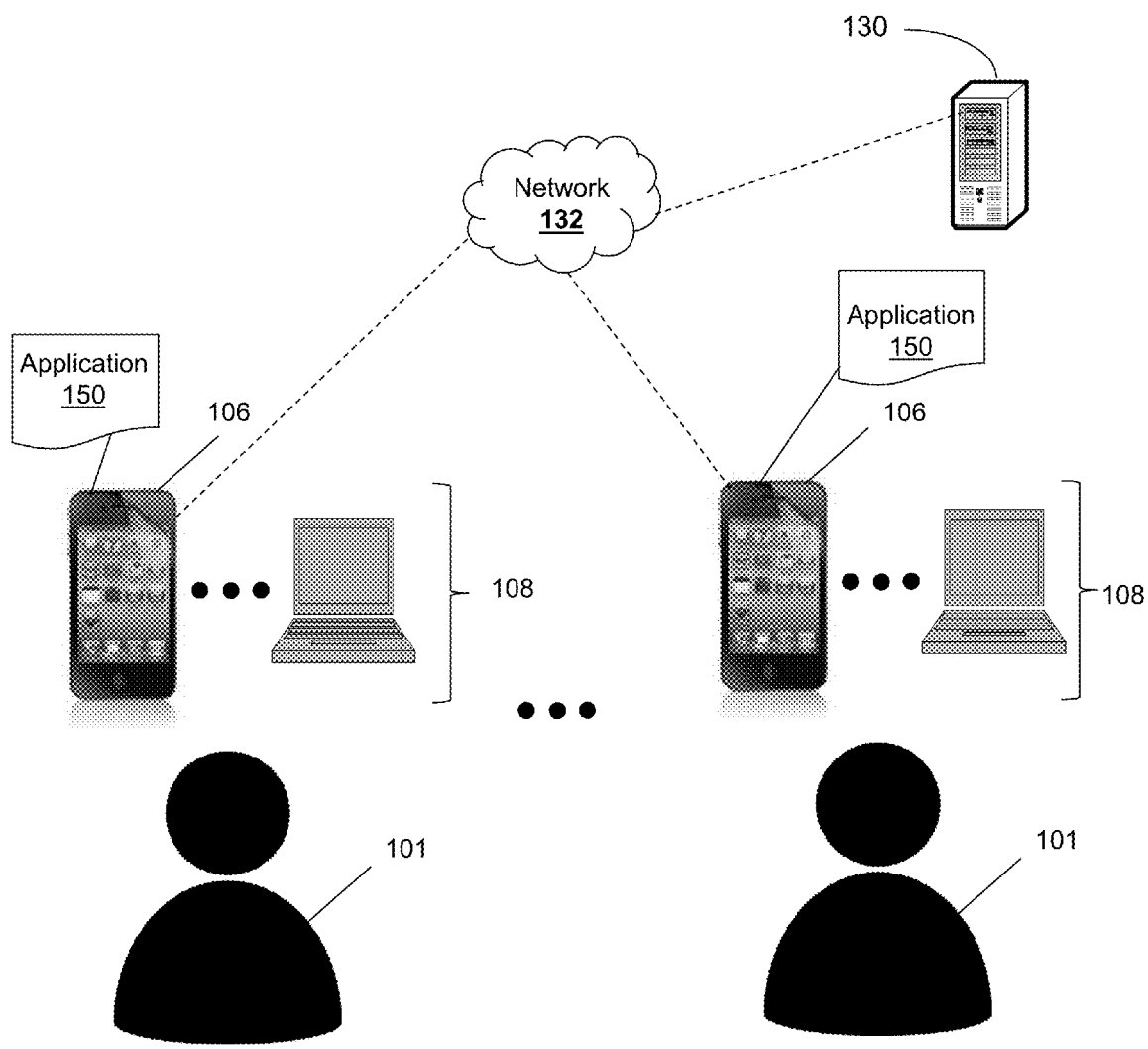
FIG. 1 depicts an illustrative embodiment of a system for managing location information including providing interaction regions for presentation at end user devices.

The subject disclosure describes, among other things, illustrative embodiments for providing location information to end user devices. In one embodiment, an interaction region can be determined for a monitored user according to current location, current activity, predicted future location, predicted future activity, and a relationships between the monitored user and the user that will be presented with the interaction region. In one embodiment, sensors and the like can be utilized for monitoring the location of a user and how long that user has been at the location. This location information which is time dependent can also be shared with various users. Other embodiments are described in the subject disclosure.

One or more aspects of the subject disclosure are a method including monitoring, by a system including a processor, a first device and a first application of a first user to determine a first current location, a first activity at the first current location, a first predicted future location, and a first predicted future activity at the first predicted future location of the first user. The method includes determining, by the system, a first relationship between the first user and a second user; and determining, by the system, a second relationship between the first user and a third user. The method includes determining, by the system, a first interaction region associated with the first user according to the first current location, the first activity, the first predicted future location, the first predicted future activity, and the first relationship, where the first interaction region represents a first geographic area in which the first user is determined to be available to meet with the second user. The method includes providing, by the system, first data indicating a location of the first interaction region to a second device of the second user, wherein the location of the first interaction region is presentable on a map by the second device in conjunction with presenting the first current location of the first user. The method includes determining, by the system, a second interaction region associated with the first user according to the first current location, the first activity, the first predicted future location, the first predicted future activity, and the second relationship, wherein the second interaction region represents a second geographic area in which the first user is determined to be available to meet with the third user; and providing, by the system, second data indicating a location of the second interaction region to a third device of the third user, wherein the location of the second interaction region is presentable on another map by the third device in conjunction with presenting the first current location of the first user.

One or more aspects of the subject disclosure include a first mobile device including a processor; and a memory that stores executable instructions that, when executed by the processor, facilitate performance of operations, including presenting, in a map, a first interaction region that is determined according to a first current location, a first activity, a first predicted future location, and a first predicted future activity of a first user of the first mobile device, where the first interaction region represents a first geographic area in which the first user is determined to be available to meet with other users. The operations include receiving, from a server, a second interaction region associated with a second user, wherein the second interaction region is determined according to a second current location, a second activity, a second predicted future location, and a second predicted future activity of the second user, and according to a relationship between the first and second users, wherein the second interaction region represents a second geographic area in which the second user is determined to be available to meet with the first user. The operations include presenting, in the map, the second interaction region.

One or more aspects of the subject disclosure include a machine-readable storage medium, comprising executable instructions that, when executed by a processor, facilitate performance of operations, including presenting, in a map, a first interaction region that is determined according to a first current location, a first activity, a first predicted future location, and a first predicted future activity of a first user of the first mobile device, wherein the first interaction region represents a first geographic area in which the first user is determined to be available to meet with other users; and presenting, in the map, a second interaction region associated with a second user, wherein the second interaction region is determined according to a second current location, a second activity, a second predicted future location, and a second predicted future activity of the second user, and according to a relationship between the first and second users, wherein the second interaction region represents a second geographic area in which the second user is determined to be available to meet with the first user.

FIG. 1 depicts an illustrative embodiment of a system 100 for generating, providing and/or presenting interaction regions associated with users 101 (only two of which are shown). The interaction regions can represent or otherwise indicate a geographic area in which a user is determined to be available to meet with another user. A determination of being available to meet can include a capability of meeting and/or a determined desire to meet. The determination can be made based on various factors, as is described herein, and can be made with or without user input.

The users 101 can have various end devices 108 including end user devices such as mobile device 106. One or more of these devices 108 of the user(s) 101 can execute one or more applications 150, such as an electronic calendar, a mapping application, a scheduling application, s social networking application, and so forth. The devices 108 of the users 101 can also include other type of devices such as a set top box, a vehicle computing system, and so forth. The devices 108 can communicate with each other, as well as with network equipment, including a network server 130, over a network 132. Network 132 can be various types of networks (e.g., wireless and/or wired networks) that operate according to various protocols.

In one embodiment, devices 108 can be monitored (e.g., by the server 130) for various information that enables determining a current location, a current activity, a predicted future location, and/or a predicted future activity (at the predicted future location) for a particular or monitored user. The monitored information can include GPS data, device activity, ongoing or previous communication sessions, applications being executed, or any other data that can be collected for determining and predicting locations and activities of a user. In one embodiment, messages can be analyzed, for example according to the authorization of the parties associated with the messages, for determining and predicting locations and activities of a user. In another embodiment, an electronic calendar can be analyzed to determine current or scheduled appointments, including a subject matter of the appointment and/or a location of the appointment. In one embodiment, one or more of the devices 108 can forward activity information to the server 130 to enable determining and predicting activities and locations.

Relationships between the users 101 can be determined (e.g., by the server 130). For example, user profile information can be obtained, such as from user and/or device profile(s) stored for one or more of the users. The user profile information can indicate a relationship such as family, friends, co-workers, neighbors and so forth. In another embodiment, the relationship can be determined based on the information collected from the monitoring of devices 108, such as determining messages between users that indicate that the users are co-workers. In another embodiment, contact lists (e.g., a local or remotely stored electronic telephone book) can be analyzed to determine relationships. In another embodiment, the determination of the relationship can be based on user input, such as presenting a prompt to a user (e.g., the monitored user) to identify a relationship with another user.

System 100 enables an interaction region associated with a particular user to be determined according to a current location, a current activity, a predicted future location, and predicted future activity. In one embodiment, this interaction region can be determined also based on a determined relationship between the monitored user and the user whose device will be presenting the interaction region. The interaction region represents a geographic area in which the particular user is determined to be available to meet with the user whose device will be presenting the interaction region. Interaction regions can be determined for any number of users and can be provided to any number of end user devices for presentation. As an example, a mobile device 106 (or other device 108) of a user can present any number of interaction regions (for monitored users), such as based on monitored users that are included in a contact list of the user, monitored users that are determined to be in a social network with the user, monitored users that are requested by the user, and so forth. In one embodiment, the interaction regions are adjusted as changes to current location, current activity, predicted future location and/or predicted future activities are detected. For instance, server 130 can adjust an interaction region to generate an adjusted interaction region, where the adjusting is according to a change in the current location. Interaction regions can change over time, such as where current activities are completed, locations are changed, and/or other events occur that alter a prediction such as with respect to a predicted future location and/or activity. In one embodiment, the interaction region can be a circle that is presentable on a map by a device 108 in conjunction with presenting a current location of the monitored user at a center of the circle. In other embodiments, the interaction regions can have various shapes which may or may not be presented in conjunction with presenting a current location of the monitored user (e.g., at a center of the interaction region).

In one embodiment, the interaction region can be determined according to available venues. For example, meeting rooms, restaurants, libraries, and so forth, can be detected and utilized in determining a size, shape, and/or position of the interaction region. In another embodiment, the venue can be analyzed with respect to preferences of the users, such as determining that one of the users is allergic to fish and altering the interaction region to avoid a seafood restaurant.

In one embodiment, the server 130 can determine a time period that the monitored user will be located at the current location, where the determining of a size of the interaction region is based on the time period. In another embodiment, the server 130 can determine weather information associated with the current location, the predicted future location, or a combination thereof, where the determining of the interaction region (e.g., size, shape, and/or position) is based on the weather information. In another embodiment, the server 130 can determine vehicle traffic information associated with the current location, the predicted future location, or a combination thereof, where the determining of the interaction region (e.g., size, shape, and/or position) is based on the vehicle traffic information.

In one embodiment, the size, shape and/or position of the interaction region can be determined according to a determination of an attention span of a monitored user, such as determining a short attention span during jogging. The monitoring or other obtaining of activity information of particular users can be performed in various ways including by obtaining information directly from devices 108 (e.g., sending a request for information) and/or by obtaining information from other devices, such as network devices providing communication services to the devices 108.

In one embodiment, system 100 can provide an automatic systematized connection with sensors of a network. For example, when a monitored user enters into a geocached location, the location is recorded within the system. If the monitored user leaves that location, that location is no longer included as a check-in for that user. For example, a follower of a person in a social network can see "where is James now?" and can see "is he still there?" Given James's consent, the device 106 can broadcast through a social network James's location automatically.

In another embodiment, manual location tagging can be utilized. For example, if James knows he is going to be in a certain location, he can tag his locator start and stop time as a part of a location check-in social network. In this example, check-ins can be made into the future, so James's social network can plan to be at a location the same time James is there.

In another embodiment, automated check-ins can be performed based upon a networked calendar. For instance, calendar items with location inserted as part of a record can be synchronized to social networks for past, current and/or future check-ins.

In one or more embodiments, location detection via mobile phone and/or wearable devices that communicate with a server service that controls permissions and connects to social network check ins via an API can be utilized. For instance, cameras with face detection can also be used to identify individual's location. In one embodiment, an Internet Of Things (IoT) sensor can be utilized that has the ability to accept an individual's "tag" and only share it with "friends" of the person who "tagged" the sensor/area/object.

Figure 2:
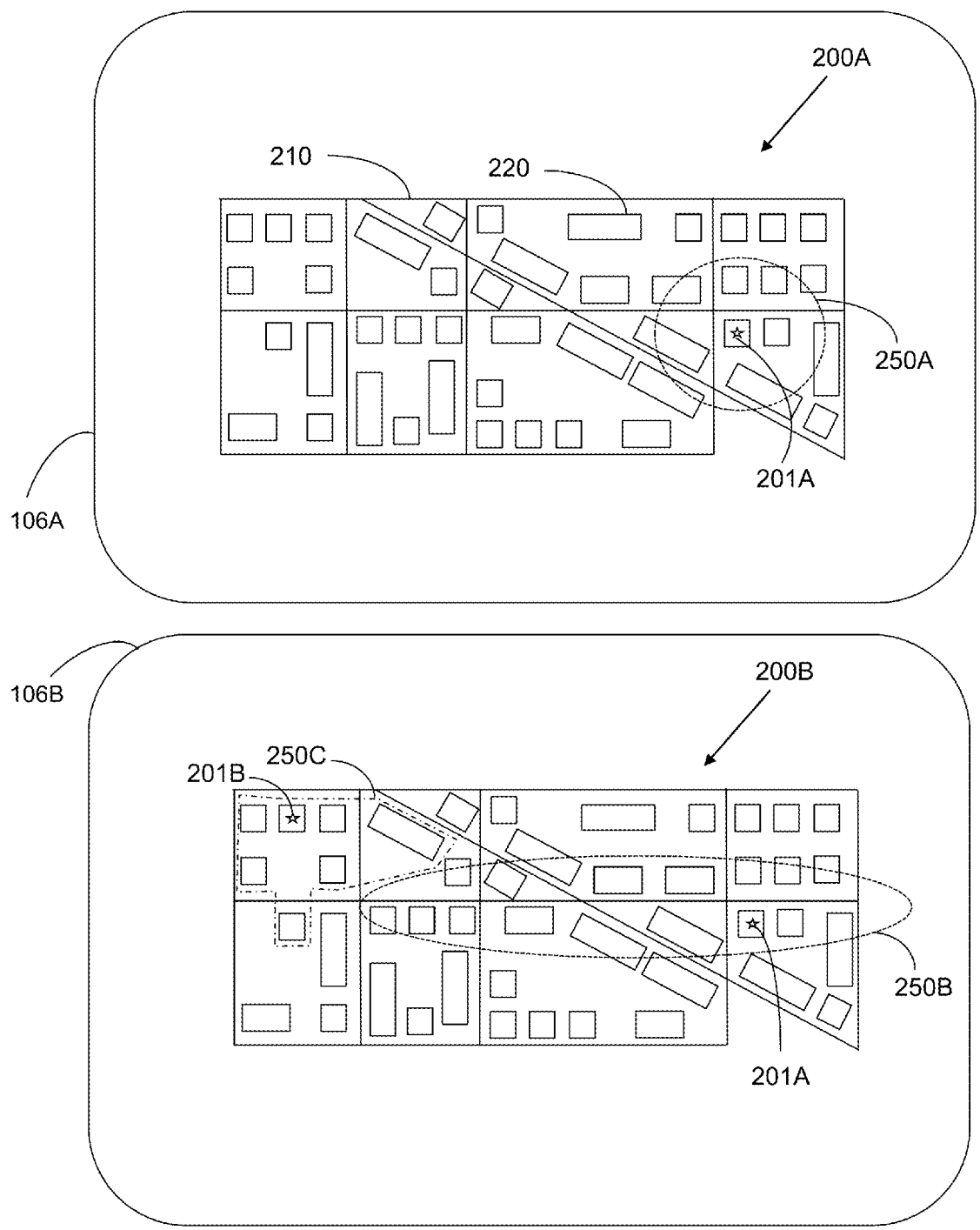
FIG. 2 depicts an illustrative embodiment of end user devices presenting interaction regions in accordance with the system described in FIG. 1.

FIG. 2 depicts an illustrative embodiment of displays of end user devices 106A and 106B that are presenting maps 200A, 200B, respectively. For example, map 200A, 200B are overhead views illustrating roads 210 and buildings 220. In map 200A, an interaction region 250A is presented where a current location of the monitored user is shown by a location icon 201A. In this example, the interaction region is circular with the location icon 201A at a center of the circle, however, the interaction region can be any shape and the current location icon can be positioned anywhere within or outside of the circle, according to the determination of the geographic region in which the monitored user is determined to be available to meet the user of device 106A.

In one embodiment, the interaction region 250A can be determined according to receiving, from the server 130, the interaction region 250A associated with a monitored user, where the interaction region is determined according to a current location, a current activity, a predicted future location, and a predicted future activity of the monitored user, and according to a relationship between the monitored user and the user of the device 106A, where the interaction region represents a geographic area in which the monitored user is determined to be available to meet with the user of the device presenting the map. Any number of interaction regions for any number of monitored users can be presented in a map by an end user device, which can be distinguished in a number of different ways such as by color, labels, and so forth.

Device 106B may present a different interaction region 250B in map 200B for the same monitored user (associated with interaction region 250A of device 106A), such as where a different relationship is determined between the monitored user and the user of device 106B. For example, interaction region 250B may be larger than interaction region 250A where the user of device 106B is a family member of the monitored user, while the user of device 106A belongs to a social networking group with the monitored user.

Map 200A illustrates that any number of interaction regions can be presented for different monitored users. For example, an interaction region 250C is illustrated which includes a location icon 201B. The interaction region 250C can be determined according to a current location, a current activity, a predicted future location, and a predicted future activity of that particular monitored user, and according to a relationship between that particular monitored user and the user of the device 106B, where the interaction region represents a geographic area in which that particular monitored user is determined to be available to meet with the user of the device presenting the map.

In one embodiment, an interaction region can be presented for the user of the device 108 that is presenting the map in combination with presenting interaction region(s) for monitored user(s). In this example, the interaction region for the user of the device 108 that is presenting the map can be determined without determining a relationship with other users. In one embodiment, a notification can be presented responsive to a determination that the user's interaction region has overlapped with a monitored user's interaction region.

Figure 3:
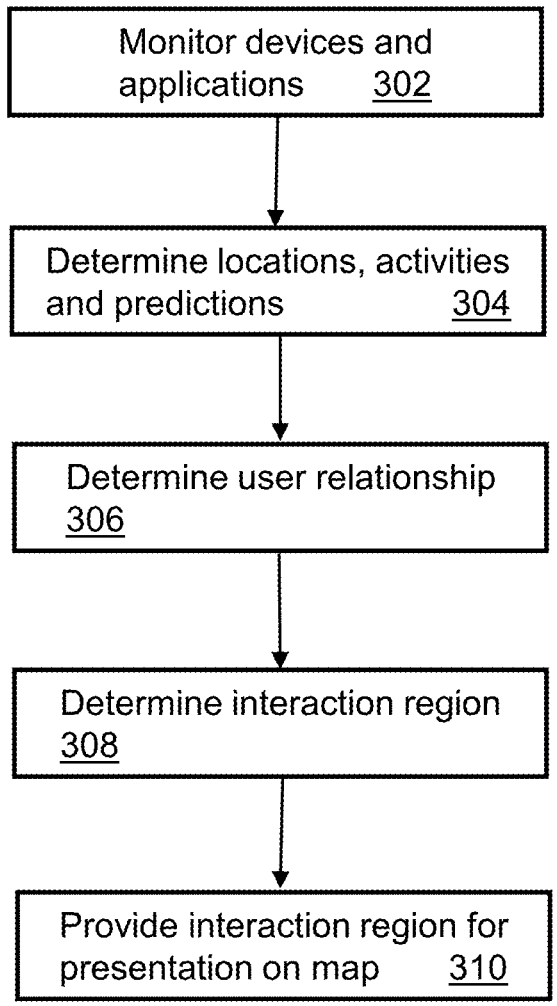
FIG. 3 depicts an illustrative embodiment of a method used in portions of the system and devices described in FIGS. 1-2.

FIG. 3 depicts an illustrative embodiment of a method 300 used by system 100 for management of location information. Various steps in method 300 can be executed by various devices and combinations of devices, including a network server and/or end use device. At 302, monitoring can be performed of one or more first devices and one or more first applications of a first user. According to the monitoring, at 304 a determination can be made of a first current location, a first activity at the first current location, a first predicted future location, and a first predicted future activity at the first predicted future location of the first user. At 306, relationships between the first user and a second user, as well as between the first user and a third user can be determined.

At 308, interaction regions can be determined. For example, a first interaction region associated with the first user can be determined according to the first current location, the first activity, the first predicted future location, the first predicted future activity, and the first relationship, where the first interaction region represents a first geographic area in which the first user is determined to be available to meet with the second user. A second interaction region can be determined according to the first current location, the first activity, the first predicted future location, the first predicted future activity, and the second relationship, where the second interaction region represents a second geographic area in which the first user is determined to be available to meet with the third user.

At 310, the first interaction region can be provided to a second device of the second user, where the first interaction region is presentable on a map by the second device in conjunction with presenting the first current location of the first user; and the second interaction region can be provided to a third device of the third user, where the second interaction region is presentable on another map by the third device in conjunction with presenting the first current location of the first user.

In one embodiment, the monitored application comprises an electronic calendar of the user, where the predicted future location and the predicted future activity are determined according to activity information included in calendar entries of the electronic calendar.

In one embodiment, the method 300 can include obtaining a first user profile of the first user, a second user profile of the second user, and a third user profile of the third user, where the determining of the first relationship is based on the first and second user profiles, and where the determining of the second relationship is based on the first and third user profiles. In one embodiment, the method 300 includes adjusting the first interaction region to generate an adjusted first interaction region, wherein the adjusting is according to a change in the first current location, wherein the adjusted first interaction region represents an adjusted first geographic area in which the first user is determined to be available to meet with the second user; and providing the adjusted first interaction region to the second device of the second user, wherein the adjusted first interaction region is presentable on the map by the second device in conjunction with presenting the change of the first current location of the first user.

In one embodiment, the method 300 includes determining weather information associated with the first current location, the first predicted future location, or a combination thereof, where the determining of the first interaction region is based on the weather information. In one embodiment, the method 300 includes determining vehicle traffic information associated with the first current location, the first predicted future location, or a combination thereof, wherein the determining of the first interaction region is based on the vehicle traffic information.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
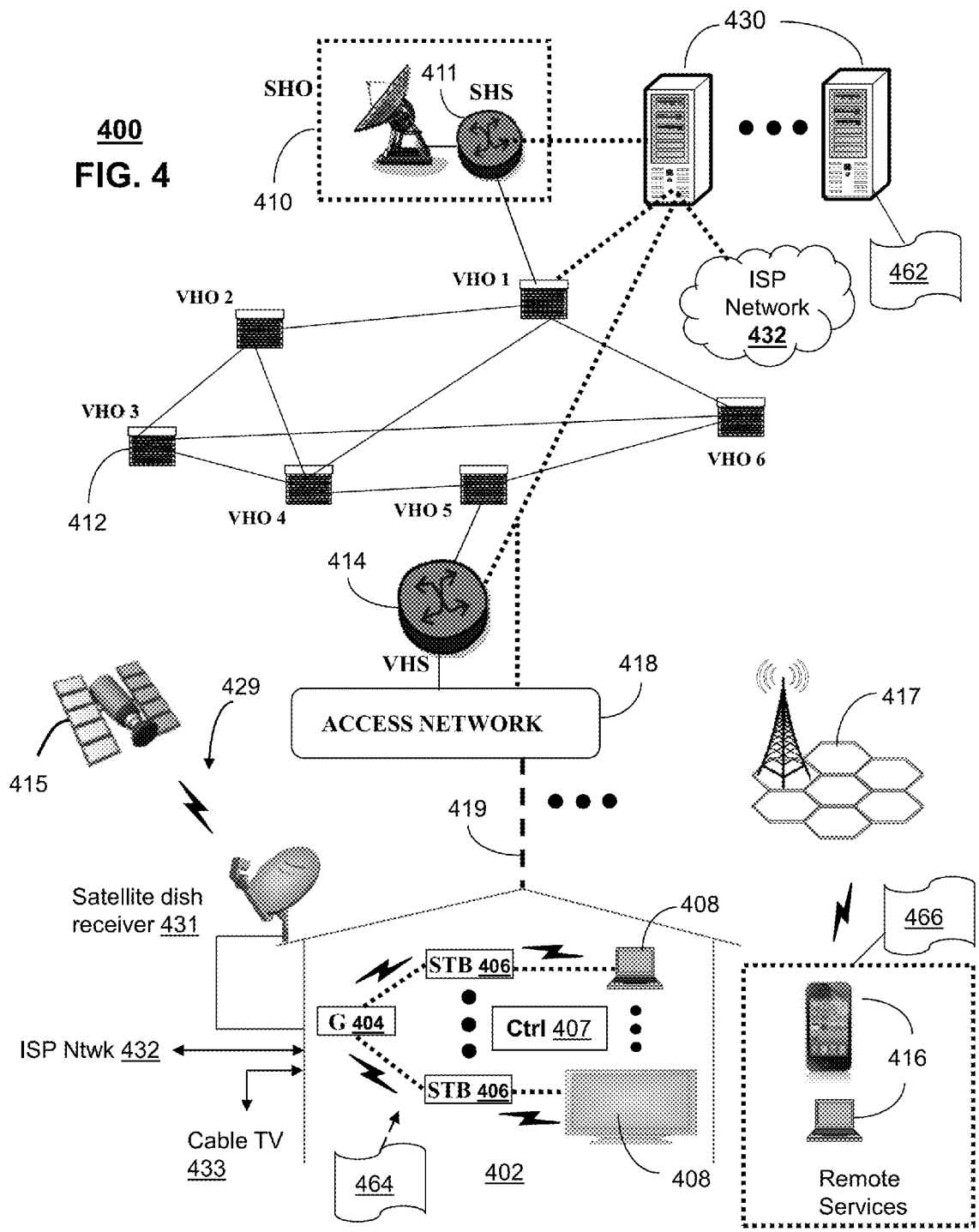
FIG. 4 depicts an illustrative embodiment of a communication system that provides media services including generating interaction regions for presentation at end user devices.

FIG. 4 depicts an illustrative embodiment of a communication system 400 for delivering content which can include mapping data, messages, audio, video and/or data. The communication system 400 can represent an interactive television system including an Internet Protocol Television (IPTV) media system. Communication system 400 can be overlaid or operably coupled with system 100 as another representative embodiment of communication system 400. For instance, one or more devices illustrated in the communication system 400 of FIG. 4 can present, in a map, a first interaction region that is determined according to a first current location, a first activity, a first predicted future location, and a first predicted future activity of a first user of the first mobile device, where the first interaction region represents a first geographic area in which the first user is determined to be available to meet with other users; and can present, in the map, a second interaction region associated with a second user, wherein the second interaction region is determined according to a second current location, a second activity, a second predicted future location, and a second predicted future activity of the second user, and according to a relationship between the first and second users, where the second interaction region represents a second geographic area in which the second user is determined to be available to meet with the first user. These functions can be performed by various devices including a network device and/or an end user (or can be distributed in more than one device).

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as an interaction region determination server (herein referred to as server 430). The server 430 can use computing and communication technology to perform function 462, which can include: monitoring a first device and a first application of a first user to determine a first current location, a first activity at the first current location, a first predicted future location, and a first predicted future activity at the first predicted future location of the first user; determining a first relationship between the first user and a second user; determining a second relationship between the first user and a third user; determining a first interaction region associated with the first user according to the first current location, the first activity, the first predicted future location, the first predicted future activity, and the first relationship, wherein the first interaction region represents a first geographic area in which the first user is determined to be available to meet with the second user; providing the first interaction region to a second device of the second user, wherein the first interaction region is presentable on a map by the second device in conjunction with presenting the first current location of the first user; determining a second interaction region associated with the first user according to the first current location, the first activity, the first predicted future location, the first predicted future activity, and the second relationship, wherein the second interaction region represents a second geographic area in which the first user is determined to be available to meet with the third user; and providing the second interaction region to a third device of the third user, wherein the second interaction region is presentable on another map by the third device in conjunction with presenting the first current location of the first user.

The media processors 406 and wireless communication devices 416 can be provisioned with software functions 464 and 466, respectively, to utilize the services of server 430. For instance, functions 464 and 466 of media processors 406 and wireless communication devices 416 can be similar to the functions described for the sending and receiving communication devices 106, 116 in accordance with method 300. For example, function 464 and/or 466 can include one or more of presenting, in a map, a first interaction region that is determined according to a first current location, a first activity, a first predicted future location, and a first predicted future activity of a first user of the first mobile device, wherein the first interaction region represents a first geographic area in which the first user is determined to be available to meet with other users; receiving, from a server, a second interaction region associated with a second user, wherein the second interaction region is determined according to a second current location, a second activity, a second predicted future location, and a second predicted future activity of the second user, and according to a relationship between the first and second users, wherein the second interaction region represents a second geographic area in which the second user is determined to be available to meet with the first user; and presenting, in the map, the second interaction region.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
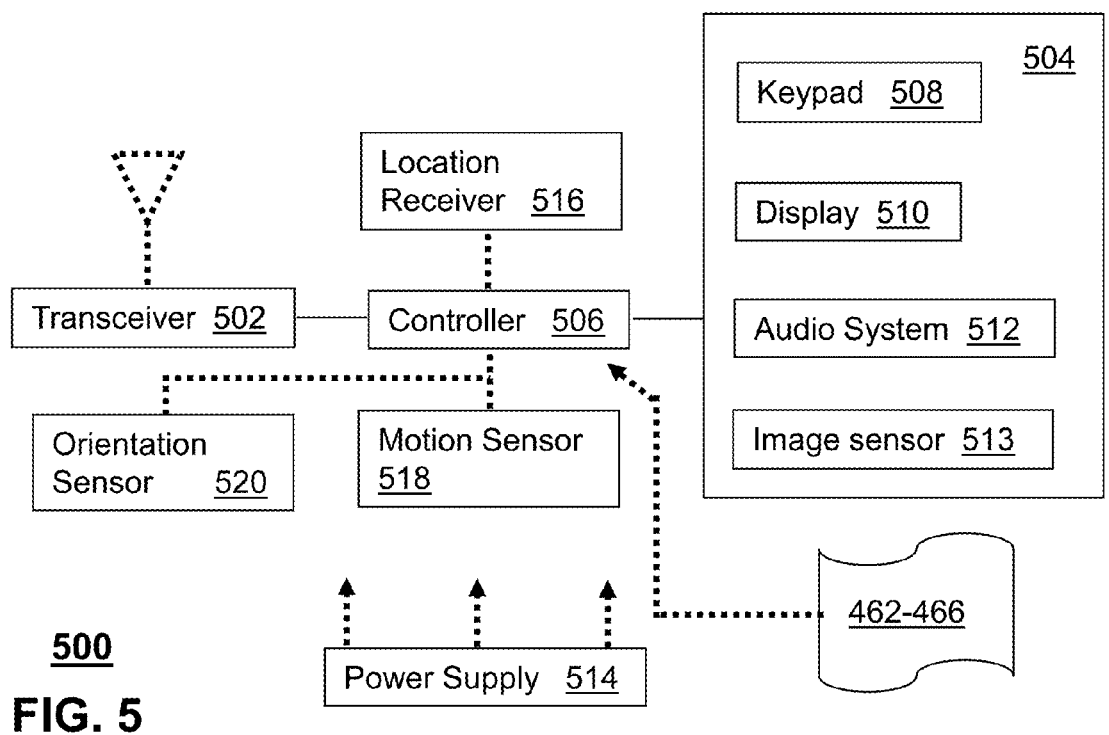
FIG. 5 depicts an illustrative embodiment of a communication device for generating, providing and/or presenting interaction regions.

FIG. 5 depicts an illustrative embodiment of a communication device 500. Communication device 500 can serve in whole or in part as an illustrative embodiment of the devices depicted in system 100, 400 and can be configured to perform portions of method 300 of FIG. 3. As an example, device 500 can monitor location and activity information for users and share that information to facilitate the users meeting with each other. The device 500 can monitor various devices of users and various applications (e.g., an electronic calendar) of users to determine current location, predicted future location, activity at present location and predicted future activity at predicted future location. These factors can be utilized to determine a likelihood and willingness or availability for a user to meet with someone at a particular location. Each of the users can be represented on a map with a circle or other shape where the diameter of the circle depends on the likelihood and willingness or availability for the user to meet with someone. Other factors such as weather, traffic, geography, and so forth can also be monitored and utilized for adjusting the size of the circle. Different circles or shapes of a first user interaction region can be provided to different other users. For example, a user may see a large circle representing his son (where his son is likely and willing to meet with him for lunch) while a salesperson may see a smaller circle representing the son (where the son is less likely and willing to meet with a salesperson).

Communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of devices 106, 108, 130, the media processor 406, the media devices 408, the portable communication devices 416 and/or the server 430. It will be appreciated that the communication device 500 can also represent other devices that can operate in systems 100, 400, such as a gaming console and a media player. In addition, the controller 506 can be adapted in various embodiments to perform the functions 462, 464, 466, respectively.

Upon reviewing the aforementioned embodiments, it would be evident to an artisan with ordinary skill in the art that said embodiments can be modified, reduced, or enhanced without departing from the scope of the claims described below.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
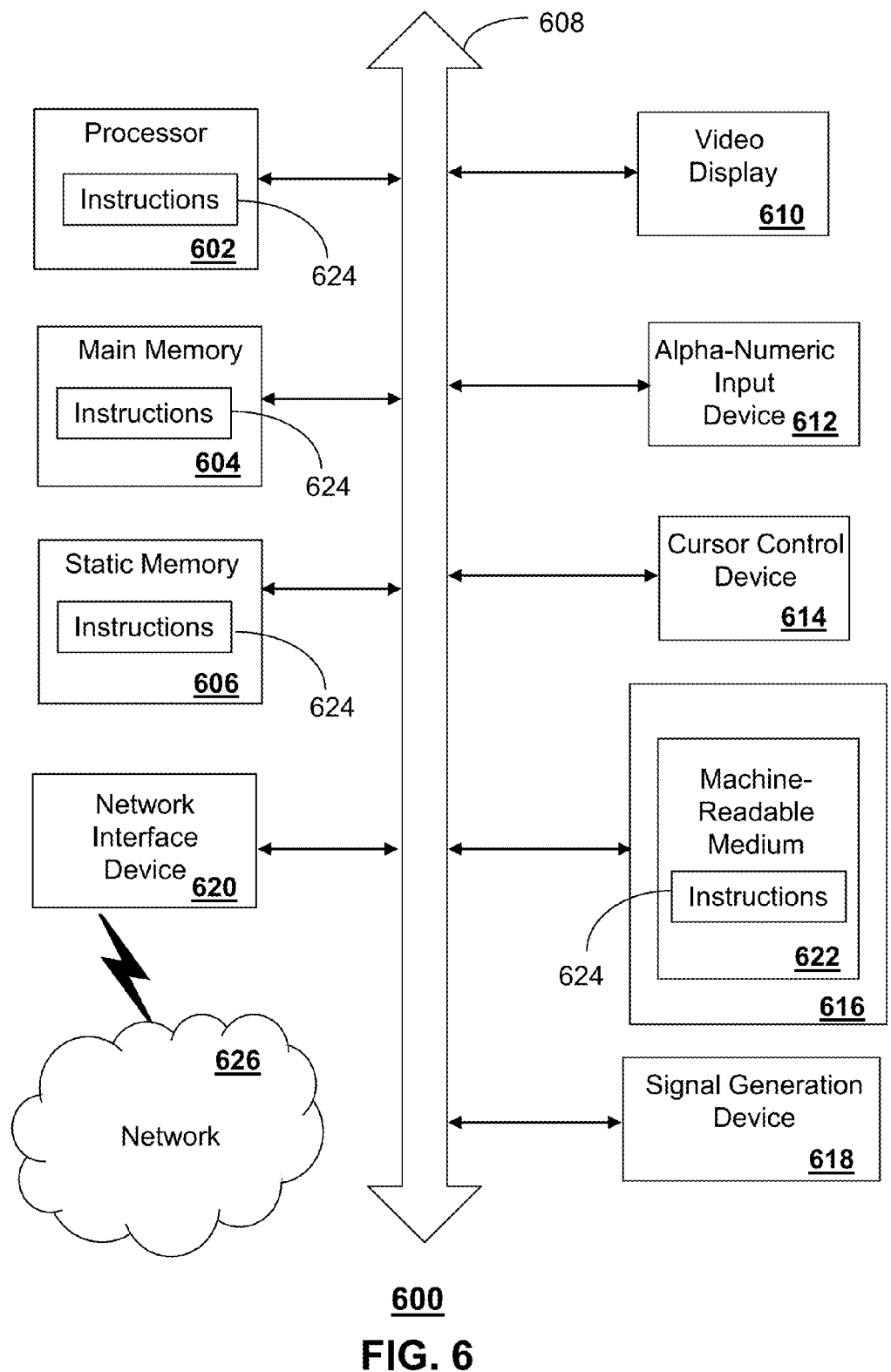
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as the server 430, the media processor 406 and other devices of FIGS. 1-2 and 4-5 to enable generating, providing, and/or otherwise presenting interaction regions for one or more users. In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Figure 7:
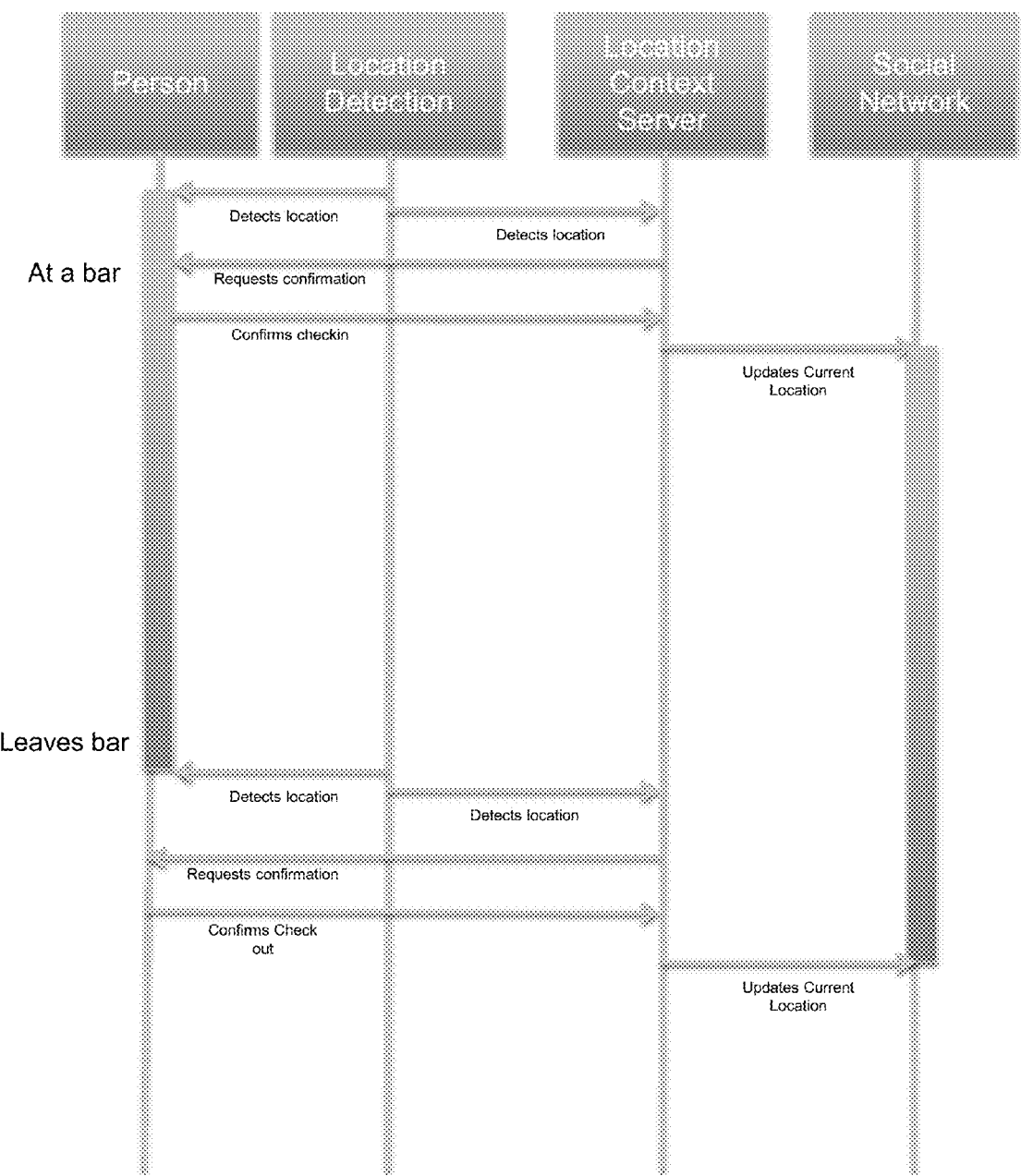
FIG. 7 depicts an illustrative embodiment of a system for managing location information.

Referring to FIG. 7, a data flow is shown for a user that enables management of location information. For example, sensors can detect a location of an individual and can communicate this information to a location context server that updates a new location. The location context server can request confirmation from the user to share new current location. The context server can update a social networking site. When an individual leaves a location and is detected by sensors, the location context server can be updated and can request a response from the person. When the person affirms, the context server can update the social network.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 600. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
   a processing system including a processor; and
   a memory that stores executable instructions that, when executed by the processing system, facilitate performance of operations comprising:
      monitoring a first mobile device and a first application of a first user to determine a first current location, a first activity and a first predicted future location;
      monitoring a second mobile device and a second application of a second user to determine a second current location;
      analyzing messages transmitted between the first mobile device and the second mobile device to determine a relationship between the first user and the second user;
      determining an interaction region representing a geographic area in which the first user is available to meet with the second user, based on the first current location, the second current location, the first activity, the first predicted future location, and the relationship; and
      sending information identifying the interaction region to the first mobile device, the second mobile device, or a combination thereof.

2. The device of claim 1, wherein the operations further comprise presenting the interaction region on a map displayed at one or both of the first mobile device and the second mobile device.

3. The device of claim 1, wherein the operations further comprise adjusting the interaction region to generate an adjusted interaction region, wherein the adjusting is according to a change in one or both of the first current location and the second current location, wherein the adjusted interaction region represents an adjusted geographic area in which the first user and the second user are determined to be available to meet.

4. The device of claim 1, wherein one or both of the first application and the second application comprises an electronic calendar.

5. The device of claim 4, wherein the operations further comprise determining a predicted location and a predicted future activity of one or both of the first user and the second user, and wherein the predicted future location and the predicted future activity are determined according to activity information included in calendar entries of the electronic calendar.

6. The device of claim 1, wherein the operations further comprise sending to one or both of the first user and the second user a request for confirmation of the first current location or the second current location respectively.

7. The device of claim 6, wherein the operations further comprise updating a social network regarding the first current location or the second current location, responsive to receiving the confirmation.

8. The device of claim 1, wherein one or both of the first mobile device and the second mobile device broadcasts over a social network the first current location or the second current location respectively.

9. The device of claim 1, wherein the operations further comprise:
determining a time period for at least one of a first presence of the first user at the first current location and a second presence of the second user at the second current location; and
determining a size of the interaction region based on the time period.

10. The device of claim 1, wherein the operations further comprise:
identifying a venue corresponding to the interaction region; and
determining, based on the venue, a size, shape, or position of the interaction region.

11. A method comprising:
monitoring, by a processing system including a processor, a first mobile device and a first application of a first user to determine a first current location, a first activity and a first predicted future location;
monitoring, by the processing system, a second mobile device and a second application of a second user to determine a second current location;
analyzing, by the processing system, messages transmitted between the first mobile device and the second mobile device to determine a relationship between the first user and the second user;
determining, by the processing system, an interaction region representing a geographic area in which the first user is available to meet with the second user, based on the first current location, the second current location, the first activity, the first predicted future location, and the relationship; and
presenting, by the processing system, the interaction region on a map displayed at one or both of the first mobile device and the second mobile device, wherein one or both of the first application and the second application comprises an electronic calendar.

12. The method of claim 11, further comprising adjusting, by the processing system, the interaction region to generate an adjusted interaction region, wherein the adjusting is according to a change in one or both of the first current location and the second current location, wherein the adjusted interaction region represents an adjusted geographic area in which the first user and the second user are determined to be available to meet.

13. The method of claim 11, further comprising determining, by the processing system, a predicted location and a predicted future activity of one or both of the first user and the second user, wherein one or both of the first application and the second application comprises an electronic calendar, and wherein the predicted future location and the predicted future activity are determined according to activity information included in calendar entries of the electronic calendar.

14. The method of claim 11, further comprising:
determining, by the processing system, a time period for at least one of a first presence of the first user at the first current location and a second presence of the second user at the second current location; and
determining, by the processing system, a size of the interaction region based on the time period.

15. The method of claim 11, further comprising:
identifying, by the processing system, a venue corresponding to the interaction region; and
determining, by the processing system, a size, shape, or position of the interaction region based on the venue.

16. A non-transitory machine-readable storage medium comprising executable instructions that, when executed by a processing system including a processor, facilitate performance of operations comprising:
monitoring a first mobile device and a first application of a first user to determine a first current location, a first activity and a first predicted future location;
monitoring a second mobile device and a second application of a second user to determine a second current location;
analyzing messages transmitted between the first mobile device and the second mobile device to determine a relationship between the first user and the second user;
determining an interaction region representing a geographic area in which the first user is available to meet with the second user, based on the first current location, the second current location, the first activity, the first predicted future location, and the relationship, wherein a size, shape and position of the interaction region is additionally based in part on weather information, vehicle traffic information, or a combination thereof; and
presenting the interaction region on a map displayed at the first mobile device, the second mobile device, or a combination thereof.

17. The non-transitory machine-readable storage medium of claim 16, wherein the operations further comprise sending to one or both of the first user and the second user a request for confirmation of the first current location or the second current location respectively.

18. The non-transitory machine-readable storage medium of claim 17, wherein the operations further comprise updating a social network regarding the first current location or the second current location, responsive to receiving the confirmation.

19. The non-transitory machine-readable storage medium of claim 16, wherein the operations further comprise:
determining a time period for at least one of a first presence of the first user at the first current location and a second presence of the second user at the second current location; and
determining a size of the interaction region based on the time period.

20. The non-transitory machine-readable storage medium of claim 16, wherein the operations further comprise:
identifying a venue corresponding to the interaction region; and
determining, based on the venue, a size, shape, or position of the interaction region.

* * * * *